United States Patent
Anandan et al.

(10) Patent No.: US 11,069,920 B2
(45) Date of Patent: Jul. 20, 2021

(54) SOLID STATE BATTERY DESIGN WITH MIXED IONIC AND ELECTRONIC CONDUCTOR

(71) Applicant: FORD GLOBAL TECHNOLOGIES, LLC, Dearborn, MI (US)

(72) Inventors: Venkataramani Anandan, Farmington Hills, MI (US); Andrew Robert Drews, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 48 days.

(21) Appl. No.: 16/284,297

(22) Filed: Feb. 25, 2019

(65) Prior Publication Data
US 2020/0274192 A1    Aug. 27, 2020

(51) Int. Cl.
*H01M 10/0562*    (2010.01)
*H01M 10/052*    (2010.01)
(Continued)

(52) U.S. Cl.
CPC ....... *H01M 10/0562* (2013.01); *H01M 4/134* (2013.01); *H01M 4/382* (2013.01);
(Continued)

(58) Field of Classification Search
CPC ......... H01M 10/0562; H01M 10/0565; H01M 10/0585; H01M 10/052; H01M 4/134;
(Continued)

(56) References Cited

U.S. PATENT DOCUMENTS

| 2006/0280998 A1 | 12/2006 | Ying et al. |
| 2010/0068617 A1* | 3/2010 | Bedjaoui ................. H01M 6/40 429/163 |

(Continued)

FOREIGN PATENT DOCUMENTS

EP    0875951 A1    11/1998

OTHER PUBLICATIONS

Wan, T. et al., "Recent Developments in Oxide-Based Ionic Conductors: Bulk Materials, Nanoionics, and Their Memory Applications," Critical Reviews in Solid State and Material Sciences, 2018, v. 43, n. 1, pp. 47-82.

*Primary Examiner* — Ula C Ruddock
*Assistant Examiner* — Matthew W Van Oudenaren
(74) *Attorney, Agent, or Firm* — David B Kelley; Brooks Kushman P.C.

(57) ABSTRACT

A solid-state battery comprises an anode in electrical contact with an anode current collector, including a first ionically conductive solid electrolyte material having a susceptibility to reduction in a presence of lithium metal such that, upon contact with lithium, the ionically conductive material partially reduces to a mixed ionic and electronic conductor including a partially reduced species, a cathode, and a separator positioned between and in ionic contact with the anode and cathode. The separator is formed of a second ionically conductive solid electrolyte material which is in contact with the first ionically conductive material but not susceptible to reduction in a presence of lithium metal and not soluble for the partially reduced species such that the separator has a susceptibility for migration of lithium ions from the mixed ionic and electronic conductor and impedes propagation or exchange of the partially reduced species from the mixed ionic and electronic conductor.

14 Claims, 3 Drawing Sheets

(51) Int. Cl.
  *H01M 10/0565* (2010.01)
  *H01M 10/0585* (2010.01)
  *H01M 2/14* (2006.01)
  *H01M 2/16* (2006.01)
  *H01M 4/134* (2010.01)
  *H01M 4/38* (2006.01)
  *H01M 50/403* (2021.01)
  *H01M 50/411* (2021.01)
  *H01M 50/431* (2021.01)
  *H01M 50/449* (2021.01)
  *H01M 4/02* (2006.01)

(52) U.S. Cl.
  CPC ..... *H01M 10/052* (2013.01); *H01M 10/0565* (2013.01); *H01M 10/0585* (2013.01); *H01M 50/403* (2021.01); *H01M 50/411* (2021.01); *H01M 50/431* (2021.01); *H01M 50/449* (2021.01); *H01M 2004/027* (2013.01); *H01M 2300/0068* (2013.01); *H01M 2300/0071* (2013.01); *H01M 2300/0077* (2013.01); *H01M 2300/0082* (2013.01)

(58) Field of Classification Search
  CPC .. H01M 4/382; H01M 2/1646; H01M 2/1653; H01M 2/1686; H01M 2/145; H01M 2300/0068; H01M 2300/0071; H01M 2300/0077; H01M 2300/0082; H01M 2004/027
  See application file for complete search history.

(56) References Cited

U.S. PATENT DOCUMENTS

| | | | |
|---|---|---|---|
| 2010/0273062 A1* | 10/2010 | Tsuchida | H01M 4/366 429/304 |
| 2011/0039162 A1* | 2/2011 | Maeda | H01M 10/0525 429/320 |
| 2012/0177998 A1* | 7/2012 | Ogawa | H01M 10/0525 429/322 |
| 2015/0147660 A1* | 5/2015 | Fujiki | H01M 4/13 429/306 |
| 2017/0250405 A1* | 8/2017 | Esaki | C04B 35/62645 |

* cited by examiner

SOLID STATE BATTERY DESIGN WITH MIXED IONIC AND ELECTRONIC CONDUCTOR

TECHNICAL FIELD

The present disclosure is related to structures and fabrication methods for solid-state batteries.

BACKGROUND

The structure of bulk-type solid state batteries (SSB) conventionally includes a lithium metal anode, a solid electrolyte separator, and a thick cathode. During charging and discharging of the SSB, lithium metal ions are deposited and stripped, respectively, at the anode surface. The deposition and stripping of the lithium ions leads to significant volume change of the anode during each charge/discharge cycle, and designing a practical SSB cell with a lithium metal anode is challenging. Furthermore, the typical planar geometry design in conventional SSBs limits the interfacial area of contact between the electrodes and the solid electrolyte, and limits current density due to interfacial resistance.

Forming bulk-type SSBs using a titanium-containing solid electrolyte is challenging because a lithium metal anode along with a titanium-containing solid electrolyte (both in the anode and separator layer) result in the reduction of titanium oxidation state from 4+ to 3+ at the anode/separator interface when the lithium metal is in direct contact with the titanium-containing electrolyte. Although this effect may be desirable on the internal surfaces of the electrolyte structure of the anode, the reduced titanium could propagate into the separator through chemical exchange or interdiffusion toward the cathode over the time and cycling, and eventually short the cell, as shown in FIG. 1.

SUMMARY

According to one or more embodiments, a solid-state battery comprises an anode including a first ionically conductive solid electrolyte material having a susceptibility to reduction in a presence of lithium metal such that, upon contact with lithium, the ionically conductive material partially reduces to a mixed ionic and electronic conductor including a partially reduced species, a cathode, and a separator. The anode is in electrical contact with an anode current collector. The separator is formed of a second ionically conductive solid electrolyte material which is in contact with the first ionically conductive material but not susceptible to reduction in a presence of lithium metal and not soluble for the partially reduced species such that the separator has a susceptibility for migration of lithium ions from the mixed ionic and electronic conductor and impedes propagation or exchange of the partially reduced species from the mixed ionic and electronic conductor contained within the anode. The separator is positioned between and in ionic contact with the anode and cathode.

According to at least one embodiment, the mixed ionic and electronic conductor may be reduced LATP, reduced LLTO, or reduced LAGP and the partially reduced species is partially reduced titanium or partially reduced germanium. In some embodiments, the separator may be a polymer or sulfide-based separator. In certain embodiments, the separator may be a titanium-free or germanium-free solid electrolyte separator. In at least one embodiment, the separator may be an LLZO or a LIPON separator. In one or more embodiments, the mixed ionic and electronic conductor may form a continuous 3D network in ionic contact with the separator and electronic contact with the anode current collector. In at least one embodiment, the anode may further comprise a continuous 3D matrix of the second ionically conductive solid electrolyte material. Further, in some embodiments, the first ionically conductive solid electrolyte material may be coated on the continuous 3D matrix such that the first ionically conductive material can reduce to the mixed ionic and electronic conductor upon contact with lithium.

According to one or more embodiments, a solid-state battery comprises an anode including a continuous network of a first ionically conductive solid electrolyte material having a susceptibility to reduction in a presence of lithium metal such that, upon contact with lithium, the ionically conductive material reduces to a mixed ionic and electronic conductor, a cathode, and a separator. The separator is formed of a second solid electrolyte material which is in contact with the first ionically conductive material, but is not susceptible to reduction in a presence of lithium metal and has low solubility to the partially reduced species formed at the first solid electrolyte such that the separator has a susceptibility for migration of ions from the mixed ionic and electronic conductor and impedes propagation or exchange of partially reduced metal species from the reduced mixed conductor phase contained within the anode. The separator is positioned between and in ionic contact with the anode and cathode, and the network is in ionic contact with the separator and in electrical contact with an anode current collector.

According to at least one embodiment, the network may be a 3D network that includes a 3D matrix of the second ionically conductive solid electrolyte material. Furthermore, in some embodiments, the first ionically conductive solid electrolyte material may be coated on the 3D matrix to form the 3D network. In one or more embodiments, the partially reduced species may be partially reduced titanium or partially reduced germanium. In certain embodiments, the separator may be a titanium-free separator or a germanium-free separator. In at least one embodiment, the separator may be a polymer or sulfide-based separator. In one or more embodiments, the separator may be an LLZO separator or a LIPON separator.

According to one or more embodiments, a method of forming a solid-state battery comprises fabricating an anode green sheet from a first ionically conductive solid electrolyte material, fabricating a cathode green sheet, fabricating a separator green sheet from a second ionically conductive solid electrolyte, and sandwiching the separator green sheet between the anode and cathode green sheets to form a stack. The first ionically conductive solid electrolyte material has a susceptibility to reduction in a presence of lithium metal forming a partially reduced species of a mixed ionic and electronic conductor, and the second ionically conductive solid electrolyte material of the separator is not susceptible to reduction in a presence of lithium metal and not soluble to the partially reduced species such that the separator has a susceptibility for migration of ions from the mixed ionic and electronic conductor and impedes propagation or exchange of the partially reduced species from anode. The method also comprises sintering the stack to form an anode layer, cathode layer, and a separator therebetween.

According to at least one embodiment, the method may further comprise providing lithium to partially reduce the first ionically conductive material to the partially reduced species. Further, in certain embodiments, the providing may occur during battery operation. In other embodiments, the providing may occur as a pre-treatment. In one or more embodiments, the mixed ionic and electronic conductor may be a reduced LATP, reduced LAGP, or reduced LLTO, and the separator may be a titanium-free or germanium-free separator.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1:
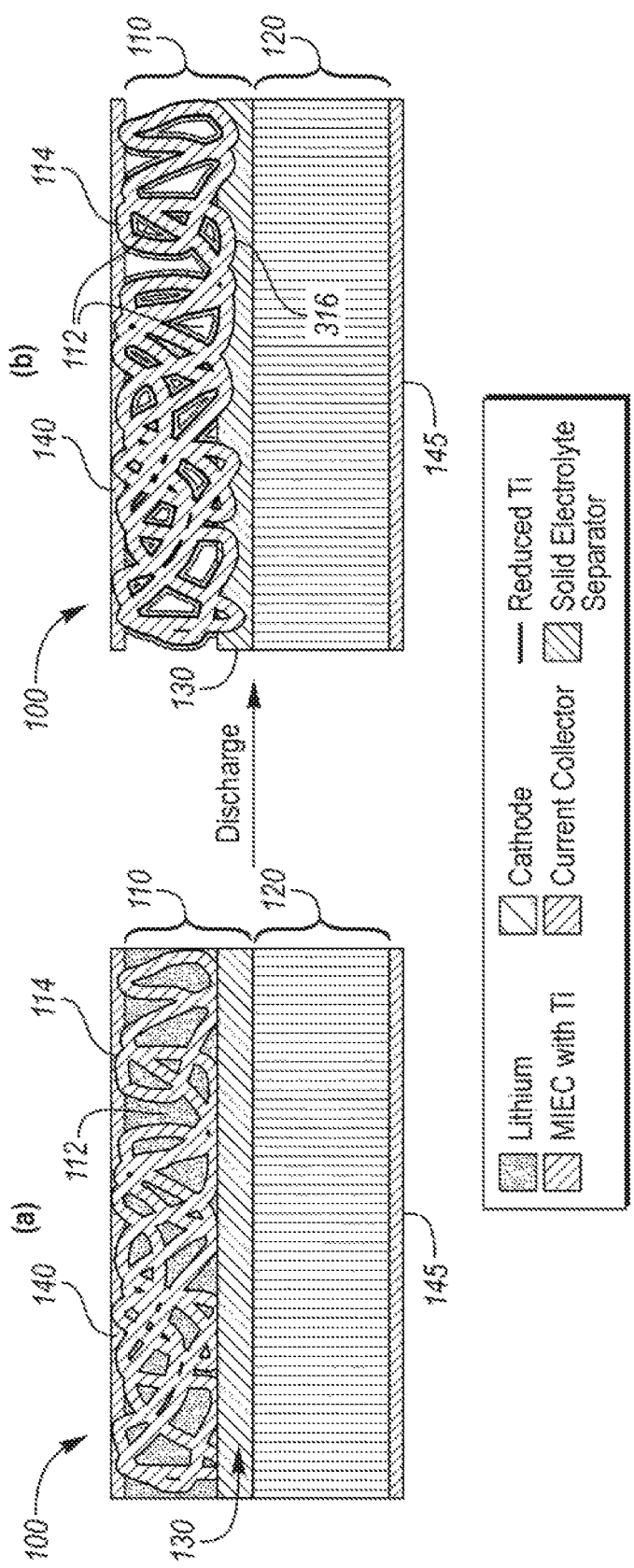
FIG. 1 is a schematic cross-section of a conventional solid-state battery before (a) and after (b) discharge.

Referring to FIG. 1, conventional SSBs include anode 110 and cathode 120 separated by separator 130. The conventional SSB also includes anode current collector 140 and cathode current collector 145. To address the volume change when lithium 112 is cycled, a conventional anode 110 is constructed using a 3D network of a mixed ionic and electronic conductor (MIEC) material 114 in electronic contact with the anode current collector 140, and in ionic contact with the separator 130. In this design, the volume change associated with deposition and stripping of lithium ions 112 can be contained, and high specific surface area of the 3D MIEC material network 114 can enable high current operation. Among various solid electrolytes used in conventional SSBs for the anode 110 and separator 130, the solid electrolytes that contain oxidized titanium, or similar solid electrolyte materials having similar reduction potentials (e.g., germanium containing solid electrolytes) typically exhibit mixed ionic and electronic properties if the ion is partially reduced (i.e., for titanium containing solid electrolytes, $Ti^{4+}$ is reduced to $Ti^{3+}$). Examples of titanium-containing solid electrolytes include LATP and LLTO, and germanium-containing solid electrolytes includes LAGP. Although LATP and LLTO are good lithium ion conductors, they are electronic insulators when titanium is in the fully oxidized (4+) state. The titanium-containing solid electrolyte, conventionally both in the anode 110 and separator 130 layer at charged state (a), can result in the partial reduction of titanium in the solid electrolyte at the anode/separator interface when the lithium metal is in direct contact with the solid electrolyte during cycling. Although this effect may be desirable on the internal surfaces of the electrolyte structure 114 of the anode 110, the partially reduced titanium could propagate by diffusion as shown in portions 150 throughout the separator 130 and cause the separator's electronic conductivity to increase (becoming a MIEC), and leading to a short-circuit of cell.

According to at least one embodiment, an SSB design is disclosed. The SSB includes a 3D percolating network or a planar electrode design formed with a partially reduced titanium-containing or partially reduced germanium-containing MIEC material (e.g., reduced LATP, reduced LLTO, or reduced LAGP). Hereinafter, although titanium may be referred to, it should be understood that titanium is interchangeable with germanium, as they have similar properties and reduction potential to titanium. Titanium is merely referred to as an example of the reduced species. Furthermore, the discussion of titanium-containing and germanium-containing is not intended to be limiting, as similar suitable solid electrolyte materials may be incorporated. When the titanium is partially reduced from 4+ to 3+, the solid electrolytes may have mixed ionic and electronic properties and behave as an MIEC material. The MIEC may include the partially reduced titanium, or, for the 3D structure, the partially reduced titanium-containing material may be a coating on a 3D structure of an ionic conductor. The 3D MIEC percolating network is positioned between an anode current collector and an ionically conductive separator layer that does not contain titanium. The 3D structure of MIEC is in electronic contact with the anode current collector and ionic contact with the separator. During cycling of the SSB, the lithium metal is plated and stripped within the pores of the MIEC network, and propagation of partially reduced titanium is impeded at the anode/separator interface because the solid electrolyte separator layer does not contain oxidized titanium or, in other embodiments, has very low solubility for the partially reduced species at the nominal operating temperatures.

Figure 2:
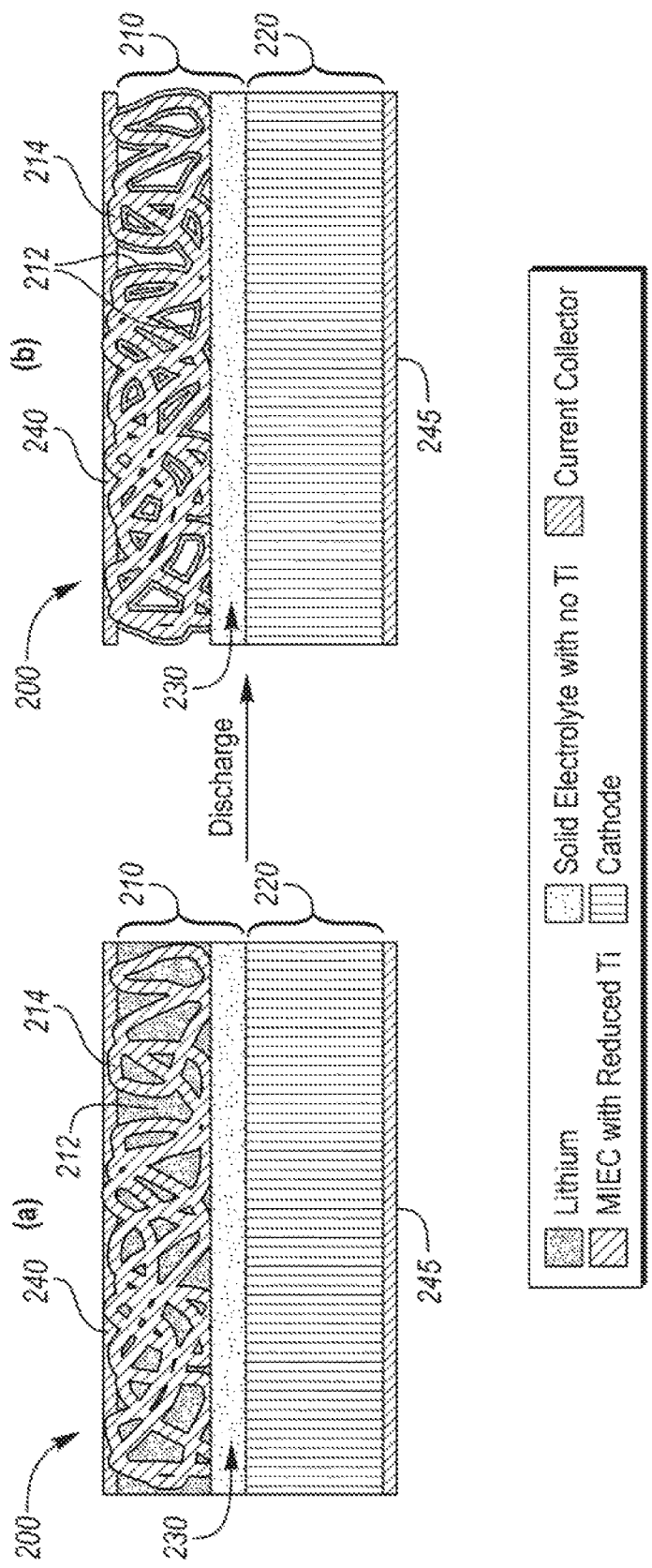
FIG. 2 is a schematic cross-section of a solid-state battery before (a) and after (b) discharge, according to an embodiment.

Referring to FIG. 2, an SSB design 200 is shown according to an embodiment. The SSB 200 includes an anode 210, a cathode 220, and a separator 230 therebetween. Separator 230 is an ionically conductive solid electrolyte separator which is not susceptible to reduction to a MIEC in the presence of lithium (e.g., without titanium). The solid electrolyte for separator 230 may be any suitable titanium-free solid electrolyte or germanium-free solid electrolyte, such as, but not limited to, an LLZO separator, a UPON separator, a sulfide-based separator, or a polymer-based separator. The SSB 200 further includes anode current collector 240 in electrical contact with the anode 210, and cathode current collector 245 in electrical contact with the cathode 220. Anode 210 includes a mixed ionic and electronic conductor (MIEC) 214 solid electrolyte material for deposition and stripping of lithium 212 from the surface of the MIEC 214. MIEC 214 is formed as a 3D network structure between the anode current collector 240 and titanium-free separator 230. MIEC 214, although shown in FIG. 2 as a 3D network, may be included in a planar structure (not shown). In certain embodiments, the MIEC 214 includes a partially reduced titanium-containing material, a partially reduced germanium-containing material, or another similar partially reduced solid electrolyte material behaving as a MIEC. Hereinafter, titanium is referred to generally, but it is understood that partially reduced titanium is used interchangeably with partially reduced germanium, or a partially reduced material having a similar reduction potential. Titanium reduction in the MIEC material may be achieved in various ways. For example, in some embodiments, the oxidized titanium in the solid electrolyte material can be partially reduced by exposure to a reducing agent such as a reducing gas or material, such as, but not limited to, $H_2$, at high temperature. In another example, the direct contact of lithium can partially reduce the $Ti^{4+}$ to $Ti^{3+}$. As such, the solid electrolyte material may be selected such that it is an ionically conductive material susceptible to partial reduction in the presence of lithium or in reducing conditions during pre-treatment to incorporate electronic conductivity, yet still retain ionic conductivity for lithium. The MIEC 214 with the partially reduced titanium is in electrical contact with the anode current collector 240, and ionic contact with the separator 230, such that lithium 212 can permeate, from charged state (a) during cycling, through the ionically conductive separator 230 during discharge to the cathode 220 to discharged state (b). Because separator 230 is titanium-free (i.e., has limited solubility to the partially reduced species) and is not susceptible to reduction in the presence of lithium (as is the property of the ionically conductive material that forms the MIEC), the partially reduced titanium is impeded from propagating through the separator 230 to cathode 220 by interdiffusion which would cause it to become a MIEC and short-circuits are thus prevented.

Figure 3:
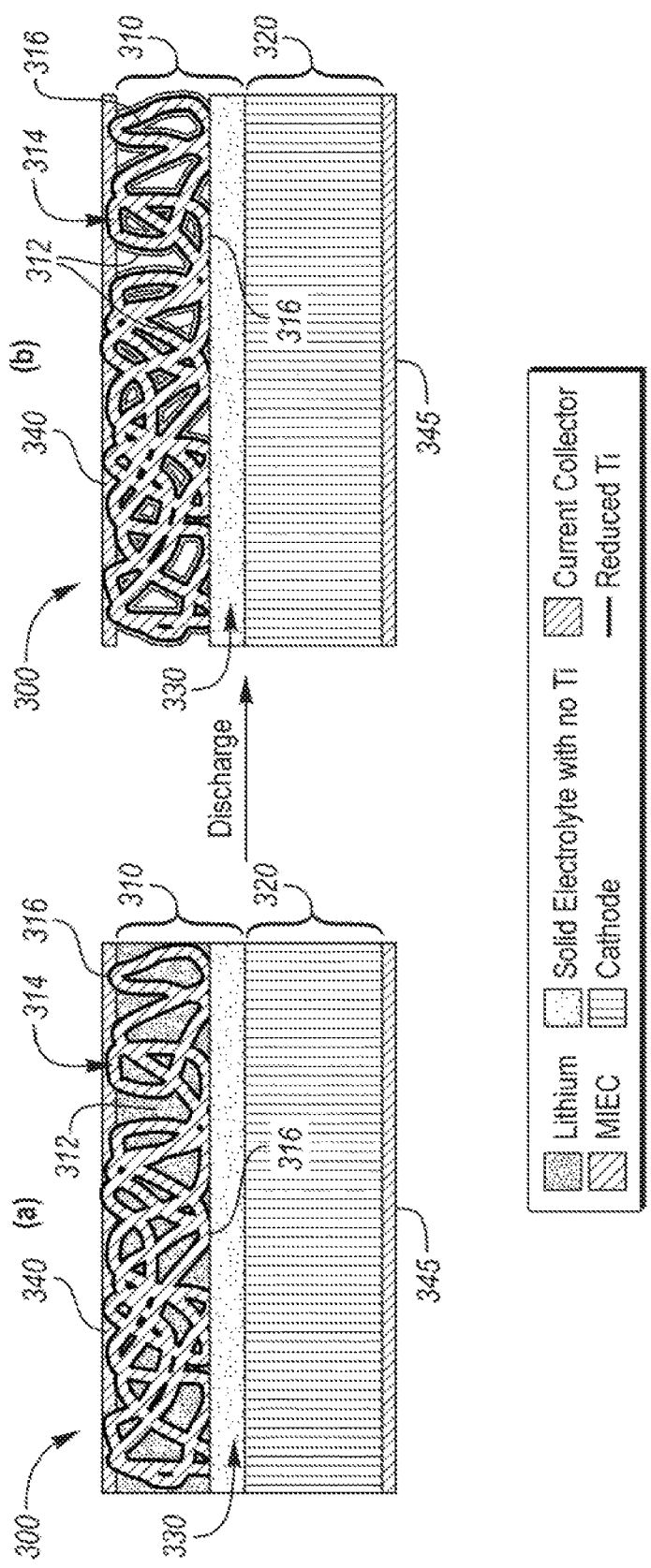
FIG. 3 is a schematic cross-section of a solid-state battery before (a) and after (b) discharge, according to another embodiment.

Referring to FIG. 3, an SSB design 300 is shown according to another embodiment. The SSB 300 includes an anode 310, a cathode 320, and a separator 330 therebetween. Separator 330 is an ionically conductive solid electrolyte separator without titanium. The solid electrolyte for separator 330 may be any suitable titanium-free (or germanium-free) solid electrolyte, such as, but not limited to, an LLZO separator, a LIPON separator, a sulfide-based separator, or a polymer-based separator. The SSB 300 further includes anode current collector 340 in electrical contact with the anode 310, and cathode current collector 345 in electrical contact with the cathode 320. Anode 310 includes a mixed ionic and electronic conductor (MIEC) solid electrolyte material 314 for deposition and stripping of lithium 312 from the surface of the MIEC solid electrolyte material 314. MIEC solid electrolyte material 314 may be formed as a 3D network structure, or a planar design (not shown), between the anode current collector 340 and titanium-free separator 330. In certain embodiments, the MIEC solid electrolyte material 314 is a 3D network of solid electrolyte without Ti (thus the bulk solid electrolyte is not susceptible to reduction in the presence of lithium ions), and is coated with a layer of a reduced titanium (or reduced germanium, referred to hereinafter interchangeably), or reduced MIEC material 316. The reduced MIEC material 316 may be achieved in various ways. For example, in some embodiments, an ionically conductive material susceptible to reduction in the presence of lithium (e.g., solid electrolytes which contains fully oxidized titanium) can be partially reduced by exposure to a reducing gas, such as, but not limited to, $H_2$, at high temperature. In another example, the direct contact of lithium metal can partially reduce the ionically conductive material to form the MIEC material 316 (e.g., a reduction of titanium from $Ti^{4+}$ to $Ti^{3+}$). The MIEC 314 coated with the reduced MIEC material 316 is in electrical contact with the anode current collector 340, and ionic contact with the separator 330, such that lithium 312 can permeate, from charged state (a) during cycling, through the ionically conductive separator 330 during discharge to the cathode 220 to discharged state (b). Because separator 330 is not susceptible to reduction in the presence of lithium and has low solubility for the partially reduces species (e.g., is titanium-free), the partially reduced surface coating of MIEC cannot exchange the partially reduced species with the ionic-only conductor and the zone of high electronic conductivity is impeded from propagating throughout the separator 330 to cathode 320, and short-circuits are prevented.

According to yet another embodiment, a fabrication method for an SSB is provided. An anode green sheet, a cathode green sheet, and a separator green sheet are fabricated by any suitable method, such as, but not limited to, casting a slurry containing inorganic solid particles, binder, and plasticizer in a solvent. The sheets are then stacked for sintering. The method includes fabricating the anode green sheet from a solid electrolyte material that contain titanium or germanium. The solid electrolyte used in the anode sheet could be either pristine (not reduced) or already be reduced prior to sintering. In an embodiment including a pristine solid electrolyte, the reduction of $Ti^{4+}$ to $Ti^{3+}$ may occur during the sintering step in either a vacuum or in the presence of a reducing gas, for example, $H_2$. In one or more embodiments, oxide based solid electrolytes, such as LLZO, LATP, or LLTO, may require a sintering temperature of more than 800° C. In other embodiments, the method includes partially reducing $Ti^{4+}$ by direct contact with lithium. In at least one embodiment, the anode green sheet includes porogens (i.e., pore formers), capable of forming a percolating 3D network of MIEC upon removal for lithium infiltration into the pores. According to an embodiment, the method includes removing the pore formers from the anode green sheet by dissolving or evaporating the porogens during fabrication, thus leaving a porous structure for the lithium to infiltrate the anode. In certain embodiments, the porogens are removed during sintering when the stack is fired. To fabricate the SSB as shown in FIG. 3, the 3D network would be formed first using the solid electrolyte not susceptible to reduction in the presence of lithium (e.g., with no Ti), then a layer of a Ti containing solid electrolyte would be deposited using vapor deposition techniques on the surface of the 3D network. This layer would subsequently be converted to a MIEC during first operation of the cell when lithium is plated onto its surface, thus forming a thin layer that has mixed ionic and electronic conductivity due to its susceptibility to reduction in the presence of lithium. In certain embodiments, the separator green sheet is fabricated from a titanium-free or germanium-free solid electrolyte, such as, but not limited to, LLZO, such that the separator is not susceptible to reduction in the presence of lithium or has low solubility for the partially reduced species of the MIEC material. Furthermore, the cathode green sheet is fabricated from a solid electrolyte and a cathode active material.

After fabricating the anode green sheet, cathode green sheet, and separator green sheet, the green sheets are stacked, respectively, such that the separator green sheet is sandwiched between anode and cathode sheets to form a stack. The stack is fired at a desired sintering temperature. During sintering, the pore formers may be removed from the anode layer leaving pores. Thereafter, lithium may be infiltrated into the porous MIEC anode structure.

An SSB design includes a 3D percolating network or planar electrode design formed with a partially reduced titanium-containing or germanium-containing MIEC material (e.g., reduced LATP, reduced LLTO, or reduced LAGP). Thus, when the titanium is partially reduced from 4+ to 3+, the solid electrolytes may have mixed ionic and electronic properties and behave as an MIEC material. The MIEC may include the partially reduced titanium, or the partially reduced titanium may be included in a coating on a 3D structure formed from a ionic conducting-only solid electrolyte. The 3D percolating network is positioned between an anode current collector and an ionically conductive separator layer that does not contain titanium. The 3D structure including the MIEC is in electronic contact with the anode current collector and ionic contact with the separator. During cycling of the SSB, the lithium metal is plated and stripped within the pores of the 3D network, and propagation of partially reduced titanium is impeded at the anode/separator interface or between a MIEC coating and the 3D network of an ionic-conducting only phase because the ionic-conducting only solid electrolyte phase(s) has low solubility for the partially reduces species (e.g., the 3D matrix does not contain titanium). Furthermore, a method of fabricating an SSB with a 3D percolating network includes forming an anode green sheet with an MIEC material and a reduced titanium material. The titanium containing solid electrolyte may be already partially reduced (a MIEC), or may be coated onto a 3D network of ionic-conducting only solid electrolyte material and then reduced by exposure to a reducing gas. The anode green sheet also includes pore formers. The method further includes fabricating a separator green sheet containing a titanium-free solid electrolyte, and fabricating a cathode green sheet containing a solid electrolyte and a cathode active material. The green sheets are stacked, sandwiching the separator green sheet, to form a stack. The stack is sintered at a desired temperature, and the pore formers are removed during sintering, leaving behind a 3D network of MIEC and reduced titanium for lithium infiltration.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A solid-state battery comprising:
   an anode including a first ionically conductive solid electrolyte material having a coating thereon with susceptibility to reduction in a presence of lithium metal such that, upon contact with lithium metal, the coating partially reduces to a mixed ionic and electronic conductor including a partially reduced species of titanium or partially reduced germanium such that the coating forms an electronic conductivity zone in the anode with both ionic and an electronic conductivity, the anode being in electrical contact with an anode current collector;
   a cathode; and
   a separator formed of a second ionically conductive solid electrolyte material which is in contact with the first ionically conductive solid electrolyte material via the coating, but not susceptible to reduction in a presence of lithium metal during cycling and not soluble for titanium or germanium such that the separator allows for migration of lithium ions from the mixed ionic and electronic conductor and impedes propagation or exchange of titanium or germanium such that the electronic conductivity zone does not enter the separator and is contained within the anode, the separator being positioned between and in ionic contact with the anode and cathode.

2. The solid-state battery of claim 1, wherein the mixed ionic and electronic conductor is reduced lithium aluminum titanium phosphate, reduced lithium lanthanum titanate, or reduced lithium aluminum germanium phosphate.

3. The solid-state battery of claim 1, wherein the separator is a polymer or sulfide-based separator.

4. The solid-state battery of claim 1, wherein the separator is a titanium-free or germanium-free solid electrolyte separator.

5. The solid-state battery of claim 1, wherein the separator is a lithium lanthanum zirconate separator or a lithium phosphorous oxynitride separator.

6. The solid-state battery of claim 1, wherein the mixed ionic and electronic conductor forms a continuous 3D network in ionic contact with the separator and electronic contact with the anode current collector.

7. The solid-state battery of claim 6, wherein the anode further comprises a continuous 3D matrix of the second ionically conductive solid electrolyte material.

8. The solid-state battery of claim 7, wherein the coating is coated on the continuous 3D matrix such that the first ionically conductive solid electrolyte material can reduce to the mixed ionic and electronic conductor upon contact with lithium metal.

9. A solid-state battery comprising:
   an anode including a continuous network of a first ionically conductive solid electrolyte material having a coating thereon with a susceptibility to reduction in a presence of lithium metal such that, upon contact with lithium metal, the coating partially reduces to a mixed ionic and electronic conductor including partially reduced titanium or partially reduced germanium;
   a cathode; and
   a separator formed of a second ionically conductive solid electrolyte material, in contact with the first ionically conductive solid electrolyte material via the coating, which is not susceptible to reduction in a presence of lithium metal and is not soluble for partially reduced titanium or partially reduced germanium such that the separator has a susceptibility for migration of lithium ions from the mixed ionic and electronic conductor and impedes propagation or exchange of titanium or germanium from the mixed ionic and electronic conductor, the separator being positioned between and in ionic contact with the anode and cathode,
   wherein the continuous network is in ionic contact with the separator and in electrical contact with an anode current collector.

10. The solid-state battery of claim 9, wherein the continuous network is a 3D network that includes a 3D matrix of the second ionically conductive solid electrolyte material.

11. The solid-state battery of claim 10, wherein the coating is coated on the 3D matrix to form the 3D network.

12. The solid-state battery of claim 9, wherein the separator is a titanium-free separator or a germanium-free separator.

13. The solid-state battery of claim 9, wherein the separator is a polymer or sulfide-based separator.

14. The solid-state battery of claim 9, wherein the separator is a lithium lanthanum zirconate separator or a lithium phosphorous oxynitride separator.

* * * * *